United States Patent Office 3,409,547
Patented Nov. 5, 1968

3,409,547
WATER CLARIFICATION PROCESS
Mahmoud T. Dajani, Park Forest, Ill., assignor to Nalco Chemical Company, Chicago, Ill., a corporation of Delaware
No Drawing. Filed Nov. 16, 1965, Ser. No. 508,159
5 Claims. (Cl. 210—54)

This invention relates to an improved clarification process. More specifically, the invention relates to a process for clarifying water which contains suspended solids and which has at least 0.1 p.p.m. of chlorine dissolved therein which comprises the addition of a poly quaternary compound to said water, thereby coagulating said suspended solids.

Municipal and industrial clarification plants process a large volume of water annually. Due to the great interest in polution control, a number of procedures have been instituted to assure that the treated water is sufficiently pure to avoid contaminating rivers, streams and other bodies of water. One particular process which has been adopted is pre-chlorination whereby water is first chlorinated to destroy harmful bacteria and other unwanted contaminants. Usually, in such a process, the amount of chlorine added exceeds the demand by the contaminants, resulting in a residual chlorine content of from 0.1 p.p.m. to 1.0 p.p.m. or higher. Oftentimes, the method of feeding chlorine to the water is not continuous. Intermittent slug feeding of chlorine results in waters which contain a high amount of chlorine, such as, for example, 6 to 7 p.p.m. or higher. The presence of chlorine in waters which are normally clarified with organic clarifying chemicals has been found to be deleterious, especially when the organic chemicals used for clarifying water are polyamines of one type or another. It has been discovered that these polyamines are unsatisfactory and, in some cases, completely ineffective in clarifying water that contains any significant amount of residual chlorine.

The other large class of clarification chemicals which are used to treat industrial and municipal waters are inorganic in nature. Examples of these are aluminum salts, iron salts and the like. However, these inorganic materials do not normally aid in removing a sufficient amount of the suspended solids in the water being treated even when large amounts are employed. In fact, the inability of these inorganic materials to completely clarify water was one of the reasons for the introduction of organic clarification agents such as polyamines.

Accordingly, it is an object of this invention to provide a process for clarifying water containing suspended solids where said water has at least 0.1 p.p.m. of chlorine dissolved therein.

Another object of this invention is to provide a class of chemicals which may be used to achieve superior clarity of water which contains at least 0.1 p.p.m. of chlorine.

Yet another object of this invention is to provide a process for clarifying chlorine-containing waters without resort to use of large amounts of inorganic chemicals.

A specific object of this invention is to modify polyamines so as to effect satisfactory clarification of waters which contain residual chlorine in any substantial amount by use of such modified polyamines.

Another object of this invention is to provide a process for clarifying water which comprises the steps of adding a minor amount of a poly quaternary compound to water which contains both suspended solids and at least 0.1 p.p.m. of dissolved chlorine, thereby coagulating said suspended solids.

Other objects will appear hereinafter.

It has now been discovered that these and other objects of this invention may be accomplished in the following manner. Specifically, it has been discovered that poly quaternary compounds are surprisingly effective in clarifying waters which contain residual chlorine in an amount ranging from 0.1 p.p.m. to as high as 6 or 7 p.p.m. or higher.

The process of this invention comprises adding a minor amount of the compounds described herein to water according to normal clarification procedures. A preferred range of addition is between 0.1 and 10 p.p.m. of the poly quaternary compound. Most preferred is to add from 0.5 to 5 p.p.m. of these compounds.

Normal clarification processes are designed to provide three zones which may be broadly defined as a fast-mixing zone, a slow-mixing zone, and a settling zone. The normal practice in the industry is to add the clarification chemicals in the fast-mixing zone. It is not contemplated that any variations in normal clarification techniques need be practiced to accomplish the objects of this invention.

The compounds of this invention have been defined as poly quaternary compounds. These compounds are polymers which contain a plurality of basic nitrogen sites in form of quaternary groups. These materials may be prepared by polymerizing a quaternary ammonium monomer, such as, for example, dimethyl diallyl ammonium chloride, or by alkylation of already formed polyamine compounds. Examples of typical polyamines which may be converted to poly quaternary compounds are: polyethyleneimine, polyethyleneamine, condensation polymers of ammonia or alkylene polyamines and poly halides such as ethylene dichloride, and addition polymers derived from monomers containing basic nitrogen groups such as dimethylaminoethyl methacrylate, 2-vinyl-pyridine, N-vinyl pyridine or substituted allyl amines. Alkylation of these polyamines to form poly quaternary compounds may be accomplished by use of a wide variety of compounds. Examples of these alkylation agents are dimethyl sulfate, methyl chloride, $C_2$–$C_{22}$ alkyl halides, such as ethyl chloride, propyl chloride, etc., alkaryl halides such as benzyl chloride, substituted benzyl chlorides, epihalohydrins such as epichlorohydrin, sulfones, oxirianes, lactones, such as beta-propiolactone, polyoxalkylene halides and the like. Preparation of these poly quaternaries is conventional, and the choice of the particular polyamines and alkylating agents is left to the discretion of the operator. A wide variety of these materials are available commercially. It is preferred, for the purposes of this invention, to alkylate at least 50% and more preferably 75% or more of the available nitrogen sites.

One requirement is that the poly quaternary compound be water-soluble at the dosage level which is employed in the process of this invention. Usually this only requires solubility in the order of about 10 p.p.m., but the more water-soluble materials are obviously preferred. Especially suitable for the purposes of this invention are those poly quaternary compounds which contain 2–3 lower alkyl groups of from 1 to 5 carbon atoms attached to the quaternary nitrogen atom. When the nitrogen atoms form part of the polymer backbone as in most condensation polymers it is preferred that remaining valences be satisfied by two lower alkyl groups. On the other hand, when the quaternary group is a side-chain off the polymer backbone as, for example, in addition polymers, it is preferred that three nitrogen valences be satisfied by lower alkyl groups.

The following examples are presented to illustrate the various embodiments of this invention and are not to be considered as limiting upon the scope of the appended claims.

EXAMPLE I

In this example, a number of polyquaternary compounds were tested on a turbid water which contained approximately 150 p.p.m. of suspended solids and 6 p.p.m. residual chlorine. These poly quaternary compounds were evaluated under a standard testing procedure whereby 1.5 p.p.m. of the quaternary compound was added to the turbid water, mixed for 5 minutes at 200 r.p.m., mixed for 10 minutes at 50 r.p.m. and then allowed to settle for 15 minutes. After the settling period, a 200 ml. aliquot of the water was siphoned and its turbidity measured using a standardized Hellige Turbidimeter.

The results of these tests are shown below in Table I. In each case, the ability of the quaternary compound to clarify the standard water was dramatically shown, when contrasted with its parent polyamine.

TABLE I.—EFFECT OF CHLORINE ON THE ACTIVITY OF POLYAMINES AND THEIR METHYL CHLORIDE QUATERNARY EQUIVALENTS

Clarification agent:  Residual turbidity, as p.p.m. $SiO_2$
(1) Ammonia-ethylene dichloride condensation polymer _____ 50.0
(2) Methyl chloride quaternary of No. 1 _____ 4.2
(3) Polyethyleneimine _____ 56
(4) Methyl chloride quaternary of No. 3 ___ 3.5
(5) Condensation polymer of tetraethylene pentaamine and epichlorohydrin _____ 62
(6) Methyl chloride quaternary of No. 5 ___ 4.7

EXAMPLE II

In this example, a synthetic turbid water was prepared by suspending 200 p.p.m. kaolin clay in deionized water. To this water, 1 p.p.m. of residual chloride was added. Experiments were then run to determine the amount of clarification agent necessary to achieve a specified residual turbidity. Specifically, a polyamine prepared by a condensation polymerization of ammonia and ethylene dichloride was added at dosage levels necessary to achieve a residual turbidity of 50 p.p.m., 30 p.p.m., 10 p.p.m. and 5 p.p.m. At the same time, similar tests were run using a quaternary derived from the above-described polyamine alkylated with methyl chloride. The results of these tests are presented below in Table II. As is readily apparent, substantially smaller amounts of the quaternary compound were necessary to achieve equivalent results. In fact, only by the use of a quaternary compound of this invention could turbidity be reduced to 5 p.p.m. or less.

TABLE II.—DOSAGE REQUIREMENTS TO ACHIEVE VARYING RESIDUAL TURBIDITY

| Clarification Agent | Dosage Required For Specific Turbidity, p.p.m. | | | |
|---|---|---|---|---|
| | 50 p.p.m. | 30 p.p.m. | 10 p.p.m. | 5 p.p.m. |
| Polyamine | 4.2 | 4.5 | 5.6 | |
| Poly quaternary | 0.8 | 1.0 | 1.5 | 1.7 |

A number of other poly quaternaries were prepared and evaluated in similar manners. For example, N-butyl chloride, alkyl chloride and benzyl chloride alkylation products of several polyamines were prepared. Evaluation of these materials showed results similar to that shown in the above examples.

While the compounds of this invention have been found to be completely satisfactory when used alone, it has also been discovered that the effectiveness of these compounds is not diminished when they are used in conjunction with the various well-known inorganic clarification agents.

Having thus described the invention, what is claimed is:
1. A process for clarifying water which has solid materials suspended therein and which has at least 0.1 p.p.m. of residual chlorine comprising the steps of adding a minor amount of a polymer which contains a plurality of basic nitrogen sites in form of quaternary groups to said water to coagulate said suspended solids, and thereafter separating said solids from said water.
2. The process of claim 1 where the polymer contains a plurality of nitrogen atoms having attached thereto 2–3 alkyl groups having from 1 to 5 carbon atoms.
3. The process of claim 2 where the alkyl group is methyl.
4. The process of claim 2 where from 0.1 to 10 p.p.m. of said polymer is added.
5. The process of claim 4 where from 0.5 to 5 p.p.m. of said polymer is added.

References Cited
UNITED STATES PATENTS
3,055,827  9/1962  Wiley _____ 210—54 X

OTHER REFERENCES

Baker, R. J.: Types and Significance of Chlorine Residuals, Jour. AWWA, vol. 51, September 1959, pp. 1185–1190.

Pomeroy, R., et al.: J. AWWA, vol. 42, September 1950, pp. 858–859.

MICHAEL E. ROGERS, *Primary Examiner*.